United States Patent [19]

Scherzer

[11] Patent Number: 5,298,153
[45] Date of Patent: Mar. 29, 1994

[54] CRACKING PROCESS USING AN ATTRITION RESISTANT CATALYST

[75] Inventor: Julius Scherzer, Anaheim, Calif.

[73] Assignee: Union Oil Company of California, Los Angeles, Calif.

[21] Appl. No.: 606,180

[22] Filed: Oct. 31, 1990

Related U.S. Application Data

[60] Division of Ser. No. 359,112, May 31, 1989, Pat. No. 4,987,110, which is a continuation-in-part of Ser. No. 312,625, Feb. 17, 1989, Pat. No. 4,880,521, which is a continuation-in-part of Ser. No. 47,852, May 7, 1987, Pat. No. 4,810,369.

[51] Int. Cl.⁵ .................. C10G 11/05; C10G 11/18
[52] U.S. Cl. ........................ 208/120; 208/121; 208/254 R; 208/52 CT; 502/65
[58] Field of Search .................. 208/120, 121

[56] References Cited

U.S. PATENT DOCUMENTS

| | | | |
|---|---|---|---|
| 3,437,604 | 4/1969 | Michalko | 252/455 |
| 3,609,103 | 9/1971 | Gladrow | 252/455 Z |
| 3,867,308 | 2/1975 | Elliott, Jr. | 252/455 Z |
| 3,957,689 | 5/1976 | Ostermaier et al. | 252/455 Z |
| 4,086,187 | 4/1978 | Lim et al. | 252/455 |
| 4,126,579 | 11/1978 | Flaherty, Jr. et al. | 502/68 |
| 4,198,319 | 4/1980 | Alafandi et al. | 502/68 |
| 4,198,320 | 4/1980 | Chester et al. | 252/455 Z |
| 4,206,085 | 6/1980 | Lim et al. | 252/455 Z |
| 4,226,743 | 10/1980 | Seese et al. | 252/453 |
| 4,417,974 | 11/1983 | Haunschild | 208/75 |
| 4,443,553 | 4/1984 | Chiang et al. | 502/68 |
| 4,457,833 | 7/1984 | Zandona et al. | 208/120 |
| 4,458,023 | 7/1984 | Welsh et al. | 502/68 |
| 4,476,239 | 10/1984 | Chiang et al. | 502/68 |
| 4,480,047 | 10/1984 | Beek et al. | 502/68 |
| 4,542,118 | 9/1985 | Nozenmack et al. | 502/68 |
| 4,551,231 | 11/1985 | Kovach | 502/50 |
| 4,810,369 | 3/1989 | Scherzer | 208/121 |
| 4,826,793 | 5/1989 | Velten et al. | 502/64 |
| 4,880,521 | 11/1989 | Scherzer | 208/121 |
| 4,987,110 | 1/1991 | Scherzer | 502/68 |

FOREIGN PATENT DOCUMENTS

| | | | |
|---|---|---|---|
| 967136 | 5/1975 | Canada | 252/60 |
| 0109064 | 5/1984 | European Pat. Off. | B01J 29/03 |
| 0240136 | 2/1987 | European Pat. Off. | C10G 11/05 |

OTHER PUBLICATIONS

H. E. Bergna, "*Attrition Resistant Microporous Particles by Spray Drying,*" Symposium on Preparation and Characterization of Catalysts, Division of Petroleum Chemistry, Inc., American Chemical Society, L.A. meeting, Sep. 25-30, 1988, pp. 676-682.

*Primary Examiner*—Helane Myers
*Attorney, Agent, or Firm*—Yale S. Finkle; Gregory F. Wirzbicki

[57] ABSTRACT

An attrition resistant catalytic cracking catalyst is prepared by spray drying an aqueous slurry containing a molecular sieve having cracking activity, a clay such as kaolin, a silica sol and aluminum chlorhydroxide. The resultant catalyst has a high attrition resistance as compared to commercially available cracking catalysts.

32 Claims, 1 Drawing Sheet

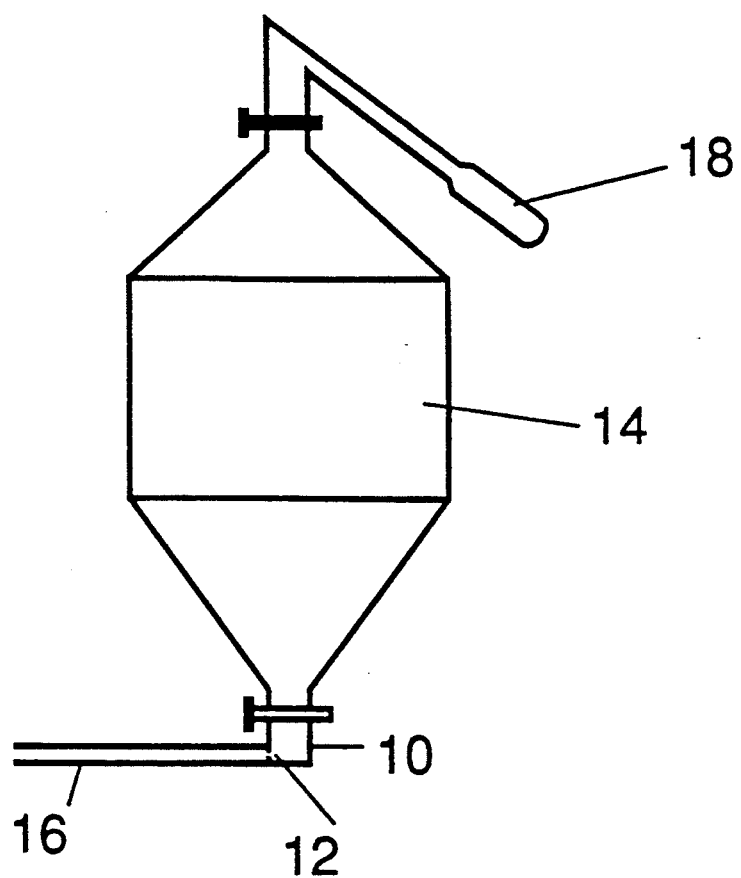

CRACKING PROCESS USING AN ATTRITION RESISTANT CATALYST

CROSS-REFERENCE TO RELATED APPLICATIONS

This application is a division of application Ser. No. 359, 112, filed in the United States Patent and Trademark Office on May 31, 1989 and now U.S. Pat. No. 4,987,170 continuation-in-part of application Ser. No. 312,625, filed in the United States Patent and Trademark Office on Feb. 17, 1989 and now U.S. Pat. No. 4,880,521, which is a continuation-in-part of application Ser. No. 047,852, filed in the United States Patent and Trademark Office on May 7, 1987 and now U.S. Pat. No. 4,810,369. The disclosures of U.S. Pat. Nos. 4,880,521 and 4,810,369 are hereby incorporated by reference in their entireties.

BACKGROUND OF THE INVENTION

This invention relates to a catalytic cracking catalyst and is particularly concerned with a cracking catalyst having a high attrition resistance, a process for making such a catalyst and a process for using such a catalyst.

Fluidized catalytic cracking (FCC) units are used in the petroleum industry to convert high boiling hydrocarbon feedstocks to more valuable hydrocarbon products, such as gasoline, having a lower average molecular weight and a lower average boiling point than the feedstocks from which they were derived. The conversion is normally accomplished by contacting the hydrocarbon feedstock with a moving bed of catalyst particles in the substantial absence of added hydrogen at temperatures ranging between about 800° F. and about 1100° F. The most typical hydrocarbon feedstock treated in FCC units comprises a heavy gas oil, but on occasion such feedstocks as light gas oils or atmospheric gas oils, naphthas, reduced crudes and even whole crudes are subjected to catalytic cracking to yield low boiling hydrocarbon products.

Catalytic cracking in FCC units is generally accomplished by a cyclic process involving separate zones for catalytic reaction, steam stripping, and catalyst regeneration. The hydrocarbon feedstock is blended with an appropriate amount of catalyst particles to form a mixture that is then passed through a catalytic reactor, normally referred to as a riser, wherein the mixture is subjected to a temperature between about 800° F. and about 1100° F., normally between about 900° F. and 1050° F., in order to convert the feedstock into gaseous, lower boiling hydrocarbons. After these gaseous, lower boiling hydrocarbons are separated from the catalyst in a suitable separator, such as a cyclone separator, the catalyst, now deactivated by coke deposited upon its surfaces, is passed to a stripper. Here the deactivated catalyst is contacted with steam to remove entrained hydrocarbons that are then combined with vapors exiting the cyclone separator to form a mixture that is subsequently passed downstream to other facilities for further treatment. The coke-containing catalyst particles recovered from the stripper are introduced into a regenerator, normally a fluidized bed regenerator, where the catalyst is reactivated by combusting the coke in the presence of an oxygen-containing gas, such as air, at a temperature which normally ranges between about 1000° F. and about 1500° F. The cyclic process is then completed by blending the reactivated catalyst particles with the feedstock entering the riser or reaction zone of the FCC unit.

In the cyclic process described above, the catalyst particles encounter mechanical stresses when they collide with each other within the walls of the FCC unit. These stresses cause the catalyst to attrit into smaller particles which can escape from the FCC unit into the atmosphere. Thus, catalysts which tend to be friable and therefore easily undergo attrition to form smaller particles are highly undesirable. The more fines that are produced by attrition in the unit, the more makeup catalyst that must be added to the unit and the greater the air pollution caused by fines escaping from the unit.

Accordingly, it is one of the objects of the present invention to provide a fluid catalytic cracking catalyst, and method for its preparation, which is highly attrition resistant. This and other objects of the invention will become more apparent in view of the following description of the invention.

SUMMARY OF THE INVENTION

In accordance with the invention, it has now been surprisingly found that cracking catalysts containing a matrix of clay and a synthetic silica-alumina component derived from a silica sol and aluminum chlorhydroxide (aluminum chlorhydrol) have an unexpectedly high attrition resistance when used in conventional fluid catalytic cracking (FCC) units and produce lower amounts of coke and hydrogen as compared to conventional cracking catalysts containing a similar type molecular sieve cracking component. These catalysts are sufficiently hard and nonfriable that the amount of makeup catalyst required for operation of the FCC unit is minimized along with emissions of fines from the unit. These highly attrition resistant catalysts are prepared by drying, preferably spray drying, a mixture of a molecular sieve having cracking activity, a clay, a silica sol and aluminum chlorhydroxide, and then calcining the resultant dried particles. Preferably, the molecular sieve utilized will be a Y zeolite or a modified Y zeolite having cracking activity and the silica sol will be substantially free of sodium and will contain silica particles having a mean diameter between about 4.0 and about 13 millimicrons or nanometers.

BRIEF DESCRIPTION OF THE DRAWING

The drawing is a schematic diagram of the apparatus used to evaluate the attrition resistance of the catalyst of the invention as described in more particularity in Example VII.

DETAILED DESCRIPTION OF THE INVENTION

In accordance with the invention, an attrition resistant catalytic cracking catalyst is prepared by combining a molecular sieve having cracking activity with a silica sol, a clay, and aluminum chlorhydroxide to form a mixture which is subsequently dried to produce catalyst particles having a high resistance to attrition. The molecular sieve component of the catalyst can be nonzeolitic or zeolitic. The term "nonzeolitic" as used herein refers to molecular sieves whose frameworks are not formed of substantially only silica and alumina tetrahedra. The term "zeolitic" as used herein refers to molecular sieves whose frameworks are formed of substantially only silica and alumina tetrahedra such as the framework present in ZSM-5 type zeolites, Y zeolites and X zeolites. Examples of nonzeolitic crystalline molecular sieves which may serve as the active cracking component of the catalyst include silicoaluminophosphates, aluminophosphates, ferrosilicates, chromosilicates, borosilicates, pillared clays, delaminated clays and crystalline silicas such as silicalite. Examples of zeolitic crystalline molecular sieves which may be used as the active cracking component of the catalyst include Y zeolites, X zeolites, zeolite beta, zeolite L, zeolite omega, mordenite, faujasite and modifications of such zeolites.

The preferred molecular sieves for use in making the catalyst of the invention are Y zeolites and modified Y zeolites which possess cracking activity. U.S. Pat. No. 3,130,007, the disclosure of which is hereby incorporated by reference in its entirety, describes Y-type zeolites having framework silica-to-alumina mole ratios between 3.0 and 6.0 with a typical Y zeolite having a framework silica-to-alumina mole ratio of about 5.0. An example of an essentially unmodified Y zeolite which can be used in the catalyst is LZY-62 zeolite, a zeolite prepared by exchanging the sodium Y zeolite known as LZY-52 with ammonium cations. Both LZY-52 and LZY-62 zeolites are sold by UOP (formerly the Linde Division of Union Carbide Corporation).

The modified Y zeolites suitable for use as the cracking component of the catalyst are generally derived from Y zeolites by treatment which results in a significant modification of the Y zeolite framework structure, usually an increase in the framework silica-to-alumina mole ratio to a value typically above 6.0, and a reduction in unit cell size. It will be understood, however, that, in converting a Y zeolite starting material to a modified Y zeolite useful in the present invention, the resulting modified Y zeolite may not have exactly the same X-ray powder diffraction pattern for Y zeolites as is disclosed in U.S. Pat. No. 3,130,007. The d-spacings may be shifted somewhat due to a shrinkage in the unit cell size caused by an increase in the framework silica-to-alumina mole ratio. The essential crystal structure of the Y zeolite will, however, be retained so that the essential X-ray powder diffraction pattern of the modified zeolite used in the cracking catalyst will be consistent with that of either Y zeolite itself or a Y zeolite of reduced unit cell size. Examples of modified Y zeolites that can be used in the process of the invention include ultrastable Y zeolites, steam-stabilized Y zeolites and dealuminated Y zeolites.

Steam-stabilized Y zeolites are Y zeolites which have been hydrothermally treated to increase the framework silica-to-alumina mole ratio but not the overall silica-to-alumina mole ratio of the zeolite. Steam stabilization normally involves calcination of the ammonium or hydrogen form of the Y zeolite starting material at relatively high temperatures, typically above about 900° F., in the presence of steam. This treatment results in the expulsion of tetrahedral aluminum from framework into nonframework positions, but normally does not remove the aluminum from the zeolite and therefore does not increase the overall silica-to-alumina mole ratio of the starting Y zeolite. A preferred steam-stabilized Y zeolite is one produced by first ammonium exchanging a Y zeolite to a sodium content between about 0.6 and 5 weight percent, calculated as $Na_2O$, calcining the ammonium-exchanged zeolite at a temperature between about 600° F. and 1650° F. in the presence of steam at a water vapor partial pressure of at least 0.2 p.s.i.a., preferably above about 2.0 p.s.i.a., and most preferably between about 5.0 and 15 p.s.i.a., to reduce the unit cell size of the ammonium-exchanged zeolite to a value in the range between about 24.40 and 24.64 angstroms, and then ammonium exchanging the steam-calcined zeolite to replace at least 25 percent of the residual sodium ions and obtain a zeolite product of less than about 1.0 weight percent sodium, preferably less than about 0.6 weight percent sodium, calculated as $Na_2O$. Such a Y zeolite is highly stable and maintains a high activity. The zeolite is described in detail in U.S. Pat. No. 3,929,672, the disclosure of which is hereby incorporated by reference in its entirety. The same or similar zeolites are sold by UOP (formerly the Linde Division of Union Carbide Corporation) as LZY-82 zeolite, by PQ Corporation as CP300-56 and by Conteka-BV as CBV-530 and CBV-531.

The dealuminated Y zeolites that can be used as a component of the cracking catalyst are Y zeolites which have been chemically treated with acids, salts, or chelating agents to increase the overall silica-to-alumina mole ratio. A preferred group of dealuminated zeolites is prepared by dealuminating a Y zeolite having an overall silica-to-alumina mole ratio below about 6.0 and is described in detail in U.S. Pat. Nos. 4,503,023 and 4,711,720, the disclosures of which patents are hereby incorporated by reference in their entireties. A preferred member of this group of zeolites is known as LZ-210, a zeolitic aluminosilicate molecular sieve available from UOP (formerly the Linde Division of the Union Carbide Corporation). LZ-210 zeolites and other zeolites of this group are conveniently prepared from a Y zeolite starting material in overall silica-to-alumina mole ratios between about 6.0 and about 20, although higher ratios are possible. Preferred LZ-210 zeolites have an overall silica-to-alumina mole ratio of about 6.1 to about 16. Typically, the unit cell size is at or below 24.65 angstroms and will normally range between about 24.40 and about 24.60 angstroms. LZ-210 zeolites having an overall silica-to-alumina mole ratio below 20 generally have a sorptive capacity for water vapor of at least 20 weight percent based on the anhydrous weight of the zeolite at 25° C. and 4.6 millimeters mercury water vapor partial pressure. Normally, the oxygen sorptive capacity at 100 millimeters mercury and $-183°$ C. will be at least 25 weight percent. In general, LZ-210 zeolites are prepared by treating Y zeolites with an aqueous solution of a fluorosilicate salt, preferably a solution of ammonium hexafluorosilicate.

The stability and/or acidity of the molecular sieves described above may be increased by exchanging the sieves with ammonium ions, polyvalent metal cations, such as rare earth-containing cations, magnesium cations or calcium cations, or a combination of ammonium ions and polyvalent metal cations, thereby lowering the sodium content until it is less than about 0.8 weight percent, preferably less than about 0.5 weight percent, and most preferably less than about 0.3 weight percent, calculated as $Na_2O$. Methods of carrying out the ion exchange are well known in the art.

For purposes of this invention, it is preferred that the molecular sieve used in the cracking catalyst be converted to its rare earth form by ion exchanging the sieve with rare earth metal cations. The rare earth metals selected for ion exchange may be any one or any combination of the lanthanide elements having atomic numbers between 57 and 71. Metals suitable for ion exchange include lanthanum, cerium, praseodymium, neodymium, samarium, europium, gadolinium, terbium, dysprosium, holmium, erbium, thulium, ytterbium and lutetium. Normally, a mixture of rare earth cations derived from a rare earth ore is introduced into the zeolite. Examples of rare earth ores that may be used as a source of rare earth metal cations include bastnaesite, monazite and xenotine.

There are many known methods for exchanging rare earth metal cations for sodium and other cations in a crystalline molecular sieve. The normal procedure is to contact the sieve with an aqueous solution containing multivalent cations of the rare earth element or elements to be exchanged into the zeolite. The solution normally contains more than about 20 grams per liter of rare earth metal cations (calculated as $RE_2O_3$, where RE is the sum of all rare earth metals under consideration, regardless of whether any one or more of such metals actually forms a trioxide of equivalent formula), and the contacting is usually accomplished by immersing the zeolite into the ion exchange solution and heating the resultant solid-liquid mixture while stirring to a temperature above ambient but usually to no more than about 100° C. If a single immersion of the sieve into the ion exchange solution is not sufficient to accomplish the desired degree of exchange, several immersions may be used.

Typically, the ion exchange of rare earth metal cations into the molecular sieve will lower the sodium content of the sieve to between about 3.0 and 4.0 weight percent sodium, calculated as $Na_2O$. In order to lower the sodium content further, it is normally necessary to calcine the rare earth exchanged sieve and then exchange the calcined sieve with ammonium ions. The ammonium ion exchange is carried out by mixing the calcined sieve with an aqueous solution containing a dissolved ammonium salt, such as ammonium nitrate, ammonium sulfate, ammonium chloride, and the like. The resulting slurry is stirred for between about 1 and about 5 hours at temperatures above ambient but less than about 100° C. Such an ammonium ion exchange can be used to lower the sodium concentration in the zeolite to less than 1.0 weight percent. If sodium levels below 0.8 weight percent are desired, the ion exchange procedure will ordinarily have to be repeated at least once. Normally, the ion exchange procedure will be repeated at least twice and occasionally several times before a reduction in sodium content below 0.3 weight percent is achieved. After the ammonium ion exchange is completed, the molecular sieve will typically contain between about 9.0 and about 17 weight percent, preferably between about 11 and about 14 weight percent, of rare earth metals, calculated as $RE_2O_3$.

The molecular sieve component of the catalyst, which is preferably a Y zeolite or modified Y zeolite that has been exchanged with rare earth metal cations, is combined with the matrix or binder components or precursors thereof by techniques including mixing, mulling, blending or homogenization. Typically, the sieve is first mixed with a silica sol to form a slurry to which the clay component is thereafter added. After addition of the clay component, the aluminum chlorhydroxide is added to form the mixture which is subsequently subjected to spray drying followed by calcination to form the attrition resistant catalyst particles of the invention.

The silica sol utilized will typically contain a concentration of silica particles ranging between about 5 and about 55 weight percent, preferably between about 10 and about 50 weight percent. These particles will generally have a mean particle size less than about 50 millimicrons or nanometers, preferably less than about 25 millimicrons and most preferably less than about 13 millimicrons. Generally the mean particle size will be greater than about 3.0 millimicrons and will typically range between about 4.0 and about 13 millimicrons, preferably between about 4.5 and about 8 millimicrons. The silica sol will normally contain less than about 0.5 weight percent sodium, calculated as $Na_2O$, preferably less than about 0.1 weight percent, and is most preferably substantially free of sodium. The pH of the silica sol may be acidic but will most frequently be basic and will typically range between about 8 and 10.5, preferably between about 8.5 and 10, and most preferably between about 8.5 and 9.5. The viscosity of the sol will typically be between about 5 and about 55 centipoises, preferably between about 5 and about 35 centipoises.

The clay component of the catalyst is preferably combined with the slurry of the molecular sieve component and the silica sol component prior to the addition of the aluminum chlorhydroxide. The pH of the slurry prior to the addition of the clay will normally be close to about 7.0, preferably between about 6.0 and 7.0. The clay component is typically a naturally occurring, relatively nonporous clay such as kaolin, hectorite, sepiolite, attapulgite, montmorillonite and holloysite. The addition of the clay to the molecular sieve-silica sol mixture does not significantly affect the pH. Also, addition of the clay to the mixture does not normally cause gelation to occur.

After the clay has been added to the molecular sieve-silica sol slurry and mixed thoroughly therewith, aluminum chlorhydroxide is added. Aluminum chlorhydroxide is available commercially as a solid product or as an aqueous solution and is typically prepared by either dissolving metallic aluminum or hydrated alumina in hydrochloric acid under controlled conditions. Commercially available aqueous aluminum chlorhydroxide solutions generally contain from about 20 to about 25 weight percent alumina and between about 7 and 9 weight percent chlorine, calculated as the element. Aluminum chlorhydroxide is frequently referred to in the art as polymeric cationic hydroxyaluminum complexes, aluminum chlorhydrol, aluminum hydroxychloride, or aluminum chlorohydrate and typically comprises polymers formed from a monomeric precursor. The preparation of aluminum chlorhydroxide solutions is disclosed in U.S. Pat. Nos. 2,196,016, 4,176,090 and 4,443,553, the disclosures of which patents are hereby incorporated by reference in their entireties.

The addition of aluminum chlorhydroxide to the mixture of molecular sieve, silica sol and clay will normally cause the mixture to begin gelling but further addition of the aluminum chlorhydroxide with mixing results in the gel becoming fluid. The resultant slurry will typically have a pH below 7.0 and can be spray dried and calcined to produce the finished catalyst particles that normally range in diameter between about 40 and about 80 microns. These particles exhibit very high resistance to attrition and therefore are ideally suited for use in fluid catalytic cracking units.

The finished catalyst can be viewed as a molecular sieve component dispersed in a matrix which is comprised of clay and a synthetic silica-alumina component in which substantially all of the silica is derived from the silica sol and substantially all of the alumina is derived from the aluminum chlorhydroxide. The term "synthetic silica-alumina component" as used herein refers to a man-made silica-alumina component as opposed to a naturally occurring component such as clay which also comprises silica and alumina. Sufficient silica sol and aluminum chlorhydroxide are used in preparing the mixture which is converted into the catalyst such that the weight ratio of silica-to-alumina in the synthetic silica-alumina component of the finished catalyst will range between about 0.10 and about 10, preferably between about 0.25 and 5.0, and most preferably between about 0.30 and about 1.0. The synthetic silica-alumina component will normally comprise between about 10 and 35 weight percent, preferably between about 15 and 30 weight percent of the finished catalyst.

A sufficient amount of the molecular sieve component is used in preparing the catalyst of the invention such that the finished catalyst will typically contain greater than about 25 weight percent of the sieve. Typically, the finished catalyst will contain between about 25 and 50 weight percent of the molecular sieve, preferably between about 25 and 45 weight percent. Sufficient clay is used in the catalyst preparation such that its concentration in the finished catalyst will usually range between about 25 and about 65 weight percent, preferably between about 30 and about 60 weight percent.

Although the finished catalyst of the invention can be used to treat any type of hydrocarbon feedstock in a cyclic catalytic cracking process to produce low boiling hydrocarbons, it has been found that these catalysts have a particularly high tolerance to nitrogen and are thus very effective for use in cracking feedstocks containing high concentrations of nitrogen, typically concentrations greater than about 0.10 weight percent total nitrogen, calculated as the element, e.g., above about 0.25 or even 0.30 weight percent. Examples of feedstocks which can be treated with the catalyst of the invention include vacuum gas oils, atmospheric gas oils, naphtha and the like. Normally, the feed material will have an API gravity in the range between about 18° and about 28°, preferably between about 20° and about 25°. A typical feedstock will contain more than about 70 volume percent liquids boiling above about 650° F. Suitable feedstocks not only include petroleum derived fractions but also hydrocarbon oils derived from coal, oil shale, tar sands and similar hydrocarbon-containing solids.

In general, it is preferred that the feedstocks to the process of the invention not contain significant concentrations of metals, such as nickel, vanadium, iron, copper and the like. Normally, the concentration of metals in the feedstock is such that the following relationship exists:

$$10[Ni]+[V]+[Fe]<10 \quad (1)$$

where [Ni], [V] and [Fe] are the concentrations of nickel, vanadium and iron, respectively, in parts per million by weight. Preferably, the sum of the values on the left hand side of equation (1) above will be less than about 8.0, most preferably less than about 5.0. Also, the concentrations of nickel and vanadium in the feedstock will typically be such that the concentration of nickel plus the concentration of vanadium is less than about 10 ppmw, preferably less than about 5 ppmw. In general, the individual concentrations of nickel, vanadium and iron in the feedstock will be less than about 8 ppmw, preferably less than about 5 ppmw and most preferably less than about 1 ppmw.

The nature and objects of the invention are further illustrated by the following examples, which are provided for illustrative purposes only and not to limit the invention as defined by the claims. Examples I through VI illustrate the effect on attrition resistance caused by (1) the use of a silica sol as the source of silica for the synthetic silica-alumina component of the matrix and (2) the weight ratio of silica-to-alumina in the synthetic silica-alumina component of the matrix. Examples II, VI and VIII through X show the effect on attrition resistance of increasing the zeolite content of the catalyst of the invention.

EXAMPLE I

An experimental cracking catalyst designated as Catalyst I was prepared by blending 569 grams (dry basis) of a calcined, rare earth-exchanged conventional Y zeolite (CREY) having a framework silica-to-alumina mole ratio of 5.0 with 500 milliliters of water for 2 minutes. Separately, 427 grams (dry basis) of silica gel were mixed with 1500 milliliters of water and the resultant mixture was added to the zeolite-water slurry. The resultant zeolite-silica gel slurry was stirred in a Cowles mixer for 10 minutes at moderate speed after which time 1422 grams (dry basis) of kaolin was added to the slurry and the resultant mixture stirred for another 10 minutes. Aluminum chlorhydroxide powder (900 grams) containing 427 grams alumina was then dissolved in 900 milliliters of water and the resultant solution gradually added to the zeolite-silica gel-kaolin slurry while stirring. The aluminum chlorhydroxide powder used is manufactured and sold by the Reheis Chemical Company as Chlorhydrol powder. Upon the initial addition of the aluminum chlorhydroxide solution, gelation of the slurry took place but the slurry became fluid again with further addition of the solution. The resulting slurry, which contained 35 weight percent solids, was spray dried and the resultant product was screened to produce particles between 40 and 140 microns in diameter. These particles were calcined at 595° C. for 2 hours. The formulation, chemical composition and physical properties of the catalyst are set forth below in Table 1.

TABLE 1

| Catalyst No. | I | II | III | IV | V | VI |
|---|---|---|---|---|---|---|
| Catalyst Formulation | | | | | | |
| Zeolite (wt %) | 20% CREY | 20% CREY | 35% LZY-72[g] | 35% RE-LZY-82 | 35% RE-LZY-82 | 35% RE-LZY-82 |
| Matrix | | | | | | |
| Silica (wt %) | 15[a] | 15[b] | 5[c] | 5[b] | 10[b] | 15[b] |
| Alumina[d] (wt %) | 15 | 15 | 15 | 15 | 15 | 15 |
| Kaolin (wt %) | 50 | 50 | 45 | 45 | 40 | 35 |
| Chemical Composition[e] | | | | | | |
| Al$_2$O$_3$ (wt %) | 37.8 | 37.8 | 38.9 | 41.2 | 37.4 | 37.6 |
| Na$_2$O (wt %) | 0.70 | 0.28 | 1.06 | 0.18 | 0.18 | 0.24 |

TABLE 1-continued

| Catalyst No. | I | II | III | IV | V | VI |
|---|---|---|---|---|---|---|
| RE$_2$O$_3$ (wt %) | 2.4 | 3.1 | 3.07 | 2.31 | 3.24 | 1.9 |
| Physical Properties | | | | | | |
| SA$^f$, m$^2$/g | 190 | 173 | 285 | 275 | 250 | 220 |
| Attrition Index | 28 | <1 | 11 | 4.6 | 3.8 | 2.7 |

$^a$Silica derived from a silica gel.
$^b$Silica derived from Nalco 2326 silica sol.
$^c$Silica derived from sodium silicate.
$^d$Alumina derived from aluminum chlorhydroxide.
$^e$Each catalyst, besides containing Al$_2$O$_3$, Na$_2$O and RE$_2$O$_3$, contains SiO$_2$ as its other component.
$^f$Surface area.
$^g$Catalyst exchanged with rare earth metal cations after spray drying.

The silica gel used in preparing the above-described experimental catalyst was produced from a commercially available sodium silicate solution which was diluted with water to a 7.5 weight percent concentration of silica. The diluted solution was then treated with sulfuric acid until the solution reached a pH of 4.0. The resulting silica gel was allowed to settle overnight, filtered and washed free of sodium with distilled water containing a few drops of ammonium hydroxide. The filter-dried silica gel was then used without prior oven drying in the preparation of Catalyst I as described above.

EXAMPLE II

An experimental catalyst designated as Catalyst II was prepared by mixing 1200 grams (dry basis) of a calcined, rare earth-exchanged conventional Y zeolite (CREY) having a framework silica-to-alumina mole ratio of 5.0 with 5660 grams of a colloidal silica sol containing 900 grams of silica. The silica sol is commercially available from Nalco Chemical Company as Product No. 2326. It is an ammonium-stabilized silica sol containing 14.5 weight percent silica having a mean particle size of 5 millimicrons. The silica sol has a pH of 9.0, a viscosity of about 5 centipoises and contains less than 0.05 weight percent sodium, calculated as Na$_2$O. The mixture of zeolite and silica sol was stirred with 900 milliliters of water in an industrial blender for 2 to 3 minutes and the resultant slurry was placed in a Cowles mixer along with 3000 grams (dry basis) of kaolin. The mixture in the Cowles mixer was then stirred for 10 minutes at moderate speed. Nineteen hundred and thirty five grams of aluminum chlorhydroxide powder (Chlorhydrol powder from the Reheis Chemical Company) containing 900 grams of alumina was dissolved in 2420 milliliters of warm water and added gradually to the mixture while stirring. Upon the initial addition of the aluminum chlorhydroxide solution, gelation of the slurry took place but the slurry became fluid again with further addition of the solution. Water was then added to obtain a 35 weight percent solids slurry and the mixture was stirred again for 10 minutes at high speed. The slurry was then spray dried and the resultant product was screened to produce particles between 40 and 140 microns in diameter. These particles were calcined at 595° C. for 2 hours. The formulation, chemical composition and physical properties of the catalyst are set forth in Table 1.

EXAMPLE III

An experimental catalyst designated as Catalyst III was prepared by mixing 3750 grams of a colloidal silica sol containing 150 grams of silica and about 46 grams of sodium, calculated a Na$_2$O, with 1350 grams (dry basis) of kaolin in a Cowles mixer for 10 minutes at moderate speed. Unlike in Example II, the silica sol was produced in the laboratory by diluting a 30 weight percent sodium silicate solution to 4 weight percent with water and then acidifying the diluted solution with 20 weight percent sulfuric acid until the pH was between about 2.8 and 3.0. After the slurry of silica sol and kaolin was prepared, 1050 grams (dry basis) of the steam-stabilized sodium Y zeolite known as LZY-72 zeolite was mixed with 2000 grams of water in a blender for 2 to 3 minutes to form a second slurry. The zeolite slurry was then combined with the silica sol-kaolin slurry and the resultant mixture was placed in a Cowles mixer and stirred for 10 minutes at a moderate speed. As the zeolite was mixed with the silica sol-kaolin slurry, gelation began to occur. About nine hundred fifty seven grams of aluminum chlorhydroxide powder (Chlorhydrol powder obtained from the Reheis Chemical Company) containing 450 of alumina was dissolved in 1200 milliliters of warm water and the resultant solution added gradually to the thickening slurry. Upon addition of the aluminum chlorhydroxide solution, the slurry again became fluid. Water was then added to obtain a 35 weight percent solids slurry and the mixture was stirred again for 10 minutes at high speed and then spray dried. The resultant product was screened to produce particles between 40 and 140 microns in diameter. The spray dried particles, which contained a high level of sodium and essentially no rare earths, were then immersed in a 5 weight percent solution of ammonium sulfate at a pH of 4.0. The pH of the slurry was adjusted to 6.8 by adding ammonium hydroxide and the slurry was stirred for 10 minutes at 70° C. and then filtered. This procedure was repeated and the resultant filtered particles were washed with warm water having a pH of 4.0 to remove sulfates. The sodium free and sulfate-free catalyst particles were then placed in a dilute solution of rare earth chlorides at a pH of between 4 and 4.5. The catalyst particles were separated from the solution by filtration and washed with acidified water followed by plain water until they were chloride free. The particles were then dried and calcined at 595° C. for 2 hours. The formulation, chemical composition and physical properties of this catalyst are set forth in Table 1.

EXAMPLE IV

Another experimental catalyst designated as Catalyst IV was prepared by the procedure described in Example II except (1) 1050 grams (dry basis) of a rare earth-exchanged, steam-stabilized ammonium zeolite known as LZY-82 were used in lieu of the calcined, rare earth-exchanged conventional Y zeolite, (2) 943 grams of the Nalco Product 2326 silica sol were used, (3) 1350 grams (dry basis) of kaolin were added to the zeolite-sol mixture and (4) an aluminum chlorhydroxide solution made by dissolving about 957 grams of Chlorhydrol powder containing 450 grams of alumina in 1210 milliliters of water was added to the zeolite-silica sol-clay slurry. The formulation, chemical composition and physical properties of this catalyst are set forth in Table 1.

EXAMPLE V

Another experimental catalyst designated as Catalyst V was prepared by the procedures described in Example IV except 1886 grams of the Nalco Product 2326 silica sol were used along with 1200 grams (dry basis) of kaolin. The formulation, chemical composition and physical properties of this catalyst are also set forth in Table 1.

EXAMPLE VI

Another experimental catalyst designated as Catalyst VI was prepared as described in Example IV except that 2829 grams of the Nalco Product 2326 silica sol were used along with 1050 grams (dry basis) of kaolin clay. The formulation, chemical composition and physical properties of this catalyst are also set forth in Table 1.

EXAMPLE VII

The experimental catalysts produced in Examples I through VI were tested for their attrition resistance in the apparatus shown in the drawing. A preweighed sample of about 5 grams of each calcined catalyst was separately placed in a specially designed jet cup 10 having an 0.0625 inch orifice 12. The jet cup is attached to the bottom of attrition chamber 14 which has a 9 inch inside diameter. Each sample was subjected for a predetermined time to a tangential jet of air having a 60 percent relative humidity which was passed through line 16 and the orifice 12 into jet cup 10 at a rate of 21 liters per minute. The flow of the air fluidizes the catalyst sample into attrition chamber 14 where the particles undergo attrition. The fine particles produced by attrition were collected overhead of chamber 14 in thimble 18. After the predetermined time elapsed, the flow of air into the jet cup was terminated and the weight of fine particles collected in thimble 18 was measured along with the weight of the particles remaining in the jet cup. The attrition index of the catalyst, which is a measure of the catalyst's attrition resistance, was calculated by dividing the weight of the fines collected in the thimble by the total weight of the catalyst sample originally placed in the jet cup and multiplying the resultant number by 100. The lower the calculated index, the more attrition resistant is the catalyst. The predetermined time any particular sample was subjected to the tangential jet of air varied from one day to another and was determined each day by subjecting a catalyst with a known attrition index to the tangential jet of air until sufficient fines were collected in the thimble to yield the known attrition index. Experimental Catalysts I through VI were separately subjected to the above-described procedure and the attrition index for each was calculated. These calculated values are set forth in Table 1. Also, the attrition index of two commercially available catalysts, GO-35 and Super DX catalysts, were measured. These values were found to be 7.8 and between 11 and 12, respectively.

A comparison of the attrition indexes for Catalysts I through VI indicates that all the catalysts prepared using the Nalco silica sol, i.e., Catalysts II, IV, V and VI, have attrition indexes below 5.0. These catalysts are highly attrition resistant as compared to commercial catalysts GO-35 and Super DX. Catalysts I and III, which were prepared, respectively, from a silica gel and a silica sol directly derived from sodium silicate, have relatively high attrition indexes indicating an attrition resistance well below that of Catalysts II, IV, V and VI. A comparison of the attrition indexes for Catalysts I and II indicates that, when the quantities of the individual catalyst components, i.e., zeolite, kaolin, alumina and silica, remain constant, the use of the Nalco silica sol in lieu of a silica gel in making the catalyst results in a catalyst having an attrition index less than 1/28th that of a catalyst made with the gel. Likewise, a direct comparison of the attrition indexes for Catalysts III and IV indicates that, when the quantities of the catalyst components remain constant, the use of the sodium-free Nalco silica sol in lieu of a silica sol derived directly from sodium silicate to make the catalyst results in a much more attrition resistant catalyst as indicated by an attrition index of 4.6 for Catalyst IV versus 11 for Catalyst III.

A comparison of the attrition resistance data for Catalysts IV through VI, which have the same composition except for variations in the amount of silica derived from the Nalco silica sol, indicates that, as the concentration of silica in the synthetic silica-alumina component of the catalyst increases, the attrition resistance of the catalyst also increases. The attrition index for Catalyst IV, which contained 5 weight percent silica derived from the Nalco silica sol, was 4.6 and decreased to 3.8 for Catalyst V, which contained 10 weight percent silica. The attrition index further decreased to 2.7 for Catalyst VI, which contained 15 weight percent silica. These data clearly show that an increase in the silica-to-alumina weight ratio in the synthetic silica-alumina component of the catalyst matrix increases the attrition resistance of the catalyst.

EXAMPLE VIII

Another experimental catalyst designated as Catalyst VIII was prepared as described in Example II except 1800 grams (dry basis) of the calcined, rare earth-exchanged Y zeolite (CREY) and 2400 grams (dry basis) of kaolin clay were used. The formulation, chemical composition and physical properties of this catalyst are set forth in Table 2 along with the attrition index measured in accordance with the procedure described in Example VII.

TABLE 2

| Catalyst No. | II | VIII | VI | IX | X | GO-35 |
|---|---|---|---|---|---|---|
| Catalyst Formulation | | | | | | |
| Zeolite (wt %) | 20% CREY | 30% CREY | 35% RE-LZY-82 | 40% RE-LZY-82 | 55% RE-LZY-82 | ~35% RE-LZY-82 |
| Matrix | | | | | | |
| Silica$^a$ (wt %) | 15 | 15 | 15 | 15 | 15 | — |
| Alumina$^b$ (wt %) | 15 | 15 | 15 | 15 | 15 | — |
| Kaolin (wt %) | 50 | 40 | 35 | 30 | 15 | — |

TABLE 2-continued

| Catalyst No. | II | VIII | VI | IX | X | GO-35 |
|---|---|---|---|---|---|---|
| Chemical Composition[c] | | | | | | |
| Al$_2$O$_3$ (wt %) | 37.8 | 37.2 | 37.6 | 34.6 | 35.2 | 24.2 |
| Na$_2$O (wt %) | 0.28 | 0.26 | 0.24 | 0.14 | 0.20 | 0.34 |
| RE$_2$O$_3$ (wt %) | 3.10 | 4.5 | 1.9 | 2.07 | 4.40 | 3.14 |
| Physical Properties | | | | | | |
| SA[d], m$^2$/g | 173 | 244 | 220 | 308 | 403 | 230 |
| Attrition Index | <1 | 1.9 | 2.7 | 3.2 | 7.7 | 7.8 |

[a]Silica derived from Nalco 2326 silica sol.
[b]Alumina derived from aluminum chlorhydroxide.
[c]Each catalyst, besides containing Al$_2$O$_3$, Na$_2$O and RE$_2$O$_3$, contains SiO$_2$ as its other component.
[d]Surface area.

EXAMPLE IX

Another experimental catalyst designated as Catalyst IX was prepared as described in Example VI except that 200 grams (dry basis) of the rare earth-exchanged LZY-82 zeolite and 900 grams (dry basis) of kaolin clay were used. The formulation, chemical composition and physical properties of this catalyst along with the attrition index as determined by the procedure described in Example VII are set forth in Table 2.

EXAMPLE X

Another experimental catalyst designated as Catalyst X was prepared as described in Example VI except 1650 grams (dry basis) of the rare earth-exchanged LZY-82 zeolite and 450 grams (dry basis) of kaolin clay were used. The formulation, chemical composition and physical properties including the attrition index as measured by the procedure described in Example VII are set forth in Table 2.

As can be seen from Table 2, the experimental catalysts set forth therein contain concentrations of zeolite increasing from 20 weight percent to 55 weight percent. A comparison of the attrition indexes for Catalysts II, VIII, VI, IX and X indicates that, at 20 weight percent zeolite, the index is below 1 and gradually increases to 7.7 as the zeolite concentration increases to 55 weight percent. The attrition index of 7.7 for Catalyst X, which contains 55 weight percent zeolite, is about the same as the attrition index of 7.8 for commercial Catalyst GO-35 which has a zeolite content of about 35 weight percent. These data indicate that higher levels of zeolite can be incorporated into the catalyst of the invention while maintaining good attrition resistance. In general, conventional methods of manufacturing cracking catalysts are limited with respect to zeolite content since the attrition resistance of conventional catalysts containing large amounts of zeolite are quite high compared to catalysts made in accordance with the invention and containing similar amounts of zeolite. This is made clear by comparing the attrition index of 2.7 for Catalyst VI, which contained 35 weight percent zeolite, with that of 7.8 for GO-35 catalyst which contained about the same amount of zeolite.

It will be apparent from the foregoing that the invention provides a highly attrition resistant cracking catalyst containing alumina derived from aluminum chlorhydroxide and silica derived from a small particle silica sol. The attrition resistance of the catalyst is significantly greater than that of commercially available catalysts containing similar amounts of zeolite and is such that zeolite concentrations as high as 55 weight percent can be easily accommodated while not deleteriously affecting the attrition resistance of the catalyst.

Although this invention has been primarily described in conjunction with examples and by reference to embodiments thereof, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. A process for the catalytic cracking of a hydrocarbon feedstock which comprises contacting said feedstock with an attrition resistant cracking catalyst under cracking conditions in the substantial absence of added molecular hydrogen in a cracking zone to convert said feedstock into lower molecular weight constituents, wherein said cracking catalyst comprises greater than about 25 weight percent of a molecular sieve dispersed in a matrix comprising a clay and a synthetic silica-alumina component and is made by the process comprising:

(a) combining said molecular sieve with said clay, a silica sol, and aluminum chlorhydroxide to form an aqueous mixture; and (b) spray drying said mixture.

2. A process as defined by claim 1 wherein said molecular sieve is a Y zeolite or a modified Y zeolite.

3. A process as defined by claim 1 wherein said molecular sieve has been exchanged with rare earth metal cations.

4. A process as defined by claim 1 wherein said molecular sieve is a steam-stabilized Y zeolite.

5. A process as defined by claim 4 wherein said steam-stabilizer Y zeolite is LZY-82 zeolite.

6. A process as defined by claim 1 wherein said molecular sieve is a dealuminated Y zeolite.

7. A process as defined by claim 6 wherein said dealuminated Y zeolite is LZ-210 zeolite.

8. A process as defined by claim 1 wherein said molecular sieve is an ultrastable Y zeolite.

9. A process as defined by claim 1 wherein said clay comprises kaolin.

10. A process as defined by claim 1 wherein said silica sol contains silica particles having a mean diameter between about 4.0 and about 13.0 millimicrons.

11. A process as defined by claim 1 wherein said cracking catalyst contains greater than about 30 weight percent of said molecular sieve.

12. A process as defined by claim 1 wherein said hydrocarbon feedstock contains greater than about 0.25 weight percent total nitrogen, calculated as the element.

13. A process as defined by claim 1 wherein the individual concentrations of nickel and vanadium in said hydrocarbon feedstock are less than about 1.0 ppmw.

14. A process as defined by claim 1 wherein said hydrocarbon feedstock contains grater than about 0.10 weight percent total nitrogen, calculated as the element.

15. A process for the catalytic cracking of a hydrocarbon feedstock which comprises contacting said feedstock with an attrition resistant cracking catalyst under cracking conditions in the substantial absence of added molecular hydrogen in a cracking zone to convert said feedstock into lower molecular weight constituents, wherein said cracking catalyst comprises greater than about 25 weight percent of a molecular sieve dispersed in a matrix comprising a clay and a synthetic silica-alumina component and is made by the process comprising:
(a) combining said molecular sieve with said clay, a silica sol and aluminum chlorhydroxide to form an aqueous mixture;
(b) drying said mixture; and
(c) calcining said dried mixture to produce said attrition resistant catalyst.

16. A process as defined by claim 15 wherein said molecular sieve is combined with said silica sol to form a first slurry, said clay is added to said first slurry to form a second slurry, and said aluminum chlorhydroxide is thereafter added to said second slurry to form said aqueous mixture which is dried.

17. A process as defined by claim 14 wherein said silica sol contains silica particles having a mean diameter between about 4.5 and about 8.0 millimicrons.

18. A process as defined by claim 14 wherein said silica sol is ammonia stabilized.

19. A process as defined by claim 14 wherein said mixture of said molecular sieve, said clay, said silica sol and said aluminum chlorhydroxide is spray dried in step (b).

20. A process as defined by claim 14 wherein said clay is kaolin, and said molecular sieve is selected from the group consisting of ultrastable Y zeolites, steam-stabilized Y zeolites and dealuminated Y zeolites.

21. A process as defined by claim 14 wherein said catalyst contains greater than about 35 weight percent of said molecular sieve.

22. A process as defined by 15 wherein the concentrations of nickel and vanadium in said feedstock are such that the concentration of nickel plus the concentration of vanadium is less than 5 ppmw.

23. A process for the catalytic cracking of a hydrocarbon feedstock which comprises contacting said feedstock with an attrition resistant cracking catalyst under cracking conditions int eh substantial absence of added molecular hydrogen in a cracking zone to convert said feedstock into lower molecular weight constituents, wherein said cracking catalyst comprises greater than 25 weight percent of a modified Y zeolite selected from the group consisting of ultrastable Y zeolites, steam-stabilized Y zeolites and dealuminated Y zeolites dispersed in a matrix comprising kaolin and a synthetic silica-alumina component and is made by the process comprising:
(a) combining said Y zeolite with said kaolin, a silica sol, and aluminum chlorhydroxide to form an aqueous mixture; and
(b) spray drying said mixture.

24. A process as defined by claim 23 wherein said catalyst contains greater than about 30 weight percent of said modified Y zeolite.

25. A process as defined by claim 23 wherein said hydrocarbon feedstock contains greater than about 0.25 weight percent total nitrogen, calculated as the element.

26. A process as defined by claim 23 wherein the individual concentrations of nickel and vanadium in said hydrocarbon feedstock are less than about 1.0 ppmw.

27. A process as defined by claim 23 wherein said modified Y zeolite is a rare earth-exchanged modified Y zeolite.

28. A process as defined by claim 27 wherein said modified Y zeolite is a steam-stabilized Y zeolite and the weight ratio of silica-to-alumina in said synthetic silica-alumina component is between about 0.30 and about 1.0.

29. A process for the catalytic cracking of a hydrocarbon feedstock which comprises contacting said feedstock with an attrition resistant cracking catalyst under cracking conditions in the substantial absence of added molecular hydrogen in a cracking zone to convert said feedstock into lower molecular weigh constituents, wherein said cracking catalyst comprises a molecular sieve dispersed in a matrix comprising a clay and a synthetic silica-alumina component and said catalyst is made by the process comprising:
(a) combining said molecular sieve with said clay, a silica sol and aluminum chlorhydroxide to form an aqueous mixture consisting essentially of said molecular sieve, said clay, said silica sol and said aluminum chlorhydroxide; and
(b) spray drying said mixture.

30. A process as defined by claim 29 wherein said molecular sieve is a modified Y zeolite.

31. A process as defined by claim 30 wherein said modified Y zeolite is selected from the group consisting of steam-stabilized Y zeolites, ultrastable Y zeolites and dealuminated Y zeolites.

32. A process as defined by claim 29 wherein said cracking catalyst contains greater than 35 weight percent of said molecular sieve.

* * * * *

UNITED STATES PATENT AND TRADEMARK OFFICE
CERTIFICATE OF CORRECTION

PATENT NO. : 5,298,153

DATED : March 29, 1994

INVENTOR(S) : Julius Scherzer

It is certified that error appears in the above-identified patent and that said Letters Patent is hereby corrected as shown below:

Title page, item [56], column 1, line 2 under "U.S. PATENT DOCUMENTS" after "Gladrow" insert -- et al. --; column 2, line 4, change "Beek et al." to -- Beck et al. --; column 2, line 5, change "Nozenmack et al." to -- Nozemack et al. --; column 2, line 6 after "Kovach" insert -- et al. --.

Title page, item [56], column 2, line 3 under "FOREIGN PATENT DOCUMENTS" change "2/1987" to -- 10/1987 --.

Column 14, claim 5, line 51, change "stabilizer" to -- stabilized --.

Column 15, claim 14, line 5, change "grater" to -- greater --; claim 17, line 30, change "14" to -- 15 --; claim 18, line 33, change "14" to -- 15 --; claim 19, line 35, change "14" to -- 15 --; claim 20, line 39, change "14" to -- 15 --; claim 21, line 43, change "14" to -- 15 --; claim 21, line 44, delete "about"; claim 23, line 53 after "conditions" change "int eh" to -- in the --.

Column 16, claim 29, line 34 after "molecular" change "weigh" to -- weight --.

Signed and Sealed this

Ninth Day of August, 1994

*Attest:*

BRUCE LEHMAN

*Attesting Officer*    Commissioner of Patents and Trademarks